United States Patent [19]
Large

[11] Patent Number: 5,115,480
[45] Date of Patent: May 19, 1992

[54] OPTICAL POLARISATION STATE CONTROLLERS

[75] Inventor: Timothy A. Large, Papworth Everard, Great Britain

[73] Assignee: Northern Telecom Europe Limited, London, England

[21] Appl. No.: 671,453

[22] Filed: Mar. 19, 1991

[30] Foreign Application Priority Data

Mar. 28, 1990 [GB] United Kingdom ............... 9006867

[51] Int. Cl.⁵ ........................... G02B 6/02; G02B 6/26
[52] U.S. Cl. .......................................... 385/12; 385/11
[58] Field of Search ............... 350/96.15, 96.20, 96.21, 350/96.29

[56] References Cited

U.S. PATENT DOCUMENTS

| | | | |
|---|---|---|---|
| 4,389,090 | 6/1983 | Le Fevre | 350/96.29 |
| 4,495,411 | 1/1985 | Rashleigh | 350/96.29 |
| 4,697,876 | 10/1987 | Dyott | 350/96.30 |
| 4,793,678 | 12/1988 | Matsumoto | 350/96.15 |
| 4,799,752 | 1/1989 | Carome | 350/96.29 |
| 4,915,468 | 4/1990 | Kim et al. | 350/96.29 X |
| 4,960,319 | 10/1990 | Dankowych | 350/96.29 |

FOREIGN PATENT DOCUMENTS

2184253 6/1989 United Kingdom .

OTHER PUBLICATIONS

Electronics Letters, vol. 16, No. 20, 25 Sep. 1980, pp. 778-780.
Journal of Lightwave Technology, vol. 8, No. 3, Mar. 1990, pp. 438-458.

*Primary Examiner*—Akm E. Ullah
*Attorney, Agent, or Firm*—Lee, Mann, Smith, McWilliams, Sweeney & Ohlson

[57] ABSTRACT

A planar coil of single mode fiber has opposed ends twisted into orthogonal planes to form a non-planar coil 20 exhibiting circular birefringence. The amount of birefringence exhibited is modulated by means of an electromechanical transducer 34 which controls the distance separating two diametrically opposed portions of the coil. Two or more such controllers may be formed in tandem with intervening additional coils 50 providing quarter-wave linear birefringence.

12 Claims, 5 Drawing Sheets

OPTICAL POLARISATION STATE CONTROLLERS

BACKGROUND OF THE INVENTION

This invention relates to optical polarisation state controllers, and in particular to such controllers in which the optical path lies in single mode optical fibre. The control of the state of polarisation (SOP) of an optical signal is an essential part of many optical sensor and coherent optics communications systems.

It is known, for instance from a paper by H. C. Lefevre entitled 'Single-Mode Fibre Fractional Wave Devices and Polarisation Controllers' (*Electronics Letters* Sept. 25, 1980 Vol. 16 No. 20 pages 778-780), that a controllable amount of stress-induced birefringence can be imparted to a length of single mode fibre by stretching, bending or twisting a portion of that length, and that such effects can be used as the basis of an SOP controller to provide any desired output SOP from the fibre for an input of defined SOP. The above-referenced paper is particularly directed to polarisation controllers in which adjustment of SOP is achieved by inducing a specific amount of linear birefringence into a length of single mode fibre by winding it into a planar coil with substantially co-linear ends, and then modifying the resulting birefringence by rotating the plane of the coil in such a way as to impart a controlled amount of twist into those ends. With reference to its FIG. 3, the paper described a tandem arrangement of two λ/4 and a λ/2 coil. The adjustment of the orientation of the two λ/4 coils may be used to convert any given input SOP to a linear SOP, and then the adjustment of the orientation of the λ/2 coil can be used to set the output to any chosen specific orientation of linear SOP.

The mounting of the coils in a manner providing easy adjustment of the orientation of each imposes some difficulty, particularly when the adjustment is not performed manually, but is performed by transducers designed to enable the output SOP to be changed in any specifically desired time-varying manner.

SUMMARY OF THE INVENTION

The present invention is specifically directed to SOP controllers with coils of single mode fibre in which control of the output SOP can be effected by linear distortions of those coils.

According to the present invention there is provided an optical fibre polarisation state controller including a coil of single mode optical fibre mechanically coupled with a transducer, said coil being a coil twisted out of planar form so as to make it circularly birefringent, and wherein the amount of the twist of the coil is adjustable under the control of the transducer.

The invention also provides an optical fibre polarisation state controller including a coil of single mode optical fibre mechanically coupled with a transducer, wherein the coil has two substantially diametrically opposed regions of relatively larger radius of curvature linked by two substantially diametrically opposed substantially planar regions of relatively smaller radius of curvature, the coil being configured such that the planes of the two planar regions of relatively smaller radius of curvature lie in substantially orthogonal planes, and wherein the spacing of the relatively larger radius of curvature regions is adjustable under the control of the transducer.

An arrangement of two or more such polarisation controllers may be arranged optically in tandem with intervening quarter-wave coils may be constructed from a single unbroken length of single mode fibre to produce a device which, by its avoidance of any need for optical splicing or coupling of component parts, is a low insertion loss device which, for a given input SOP, can be readily adjusted to provide any desired output SOP.

BRIEF DESCRIPTION OF THE DRAWINGS

There follows a description of a polarisation state controller embodying the invention in a preferred form. Also described is a tandem arrangement of two such controllers and an intervening quarter-wave coil all constructed using a single unbroken length of single mode fibre. Additionally there is described a tandem arrangement of three such controllers with an intervening quarter-wave coil between each pair of controllers, the controllers and coils similarly all being constructed using a single unbroken length of single mode fibre.

The description refers to the accompanying drawings in which.

DETAILED DESCRIPTION OF PREFERRED EMBODIMENTS

Figure 1:
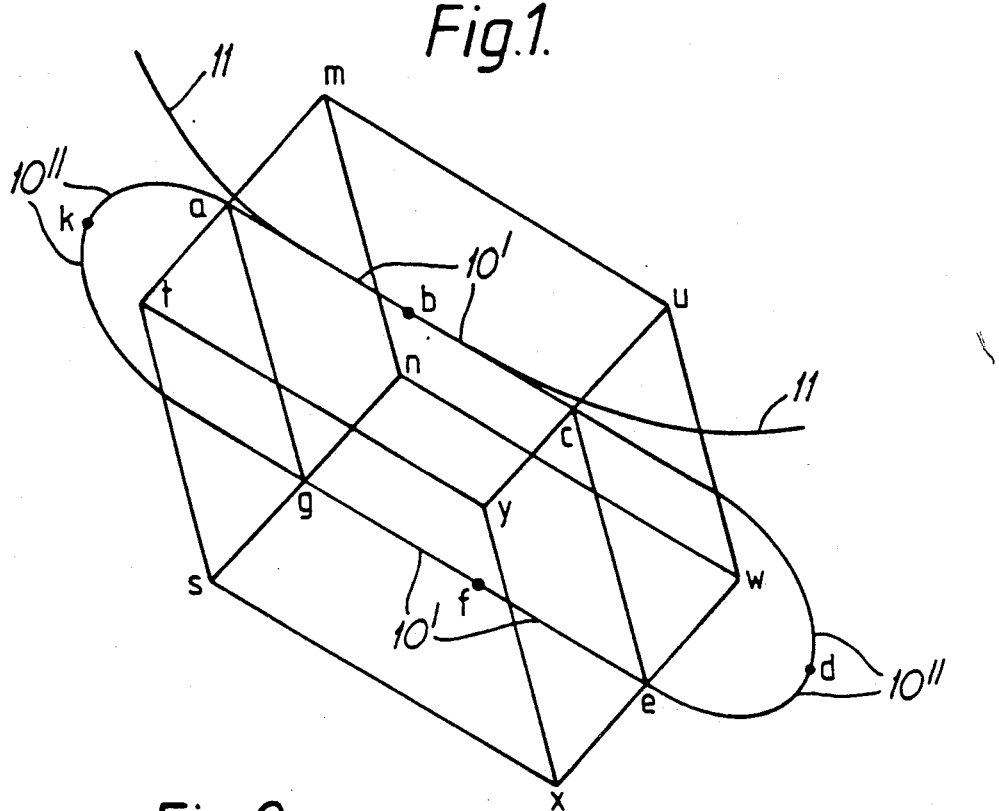
FIG. 1 depicts a planar coil of single mode optical fibre.

In FIG. 1 there is depicted a non-circular planar coil 10 of n turns of single mode fibre 11. This coil has two diametrically opposed straight portions 10' linked by two diametrically opposed co-planar portions 10" of uniform radius of curvature. For the purpose of facilitating an understanding of how this coil 10 is subsequently twisted into a non-planar form, the coil is represented with its straight portions 10', extending respectively from 'a' through 'b' to 'c' and from 'e' through 'f' to 'g', extending along the mid lines of the upper and lower faces of a cuboid with square end-faces m, n, s, t and u, w, x, y measuring 2r by 2r.

According to the paper by H. C. Lefevre, to which previous reference has been made, the differential phase delay introduced into a length of single mode fibre by bending it to a particular radius of curvature is inversely proportional to the square of the radius of curvature, and directly proportional to the length of fibre over which the curvature is maintained. It follows therefore that, in the case of a circular planar coil, the differential phase delay is expected to be proportional to the inverse single power of the radius of curvature of the coil. In the case of a coil 10 of the shape depicted in FIG. 1, the straight portions 10' introduce no birefringence, and so the differential phase delay is provided exclusively by the curved portions 10" with the result that the differential delay of the coil 10 is expected to be the same as that provided by a circular planar coil of radius 'r'. Accordingly theory predicts that the phase delay of the coil 10 is an inverse function of the distance separating the two straight portions 10'. It has been found in practice that when a length of single mode fibre 11 is wound without twisting into a planar form 10 of FIG. 1 it exhibits a linear birefringence. It has also been found in practice that when the distance separating the two straight portions is modulated, for instance by driving an electromechanical transducer such as a loudspeaker coil and magnet assembly (not shown in FIG. 1) whose front and back surfaces have been secured respectively to the mid-points 'b' and 'f' of the straight portions, such modulation produces a modulation of the amount of linear birefringence provided by the coil. The magnitude of this modulation of linear birefringence is, however, inconveniently small for producing a $\lambda/2$ change in birefringence.

Figure 2:
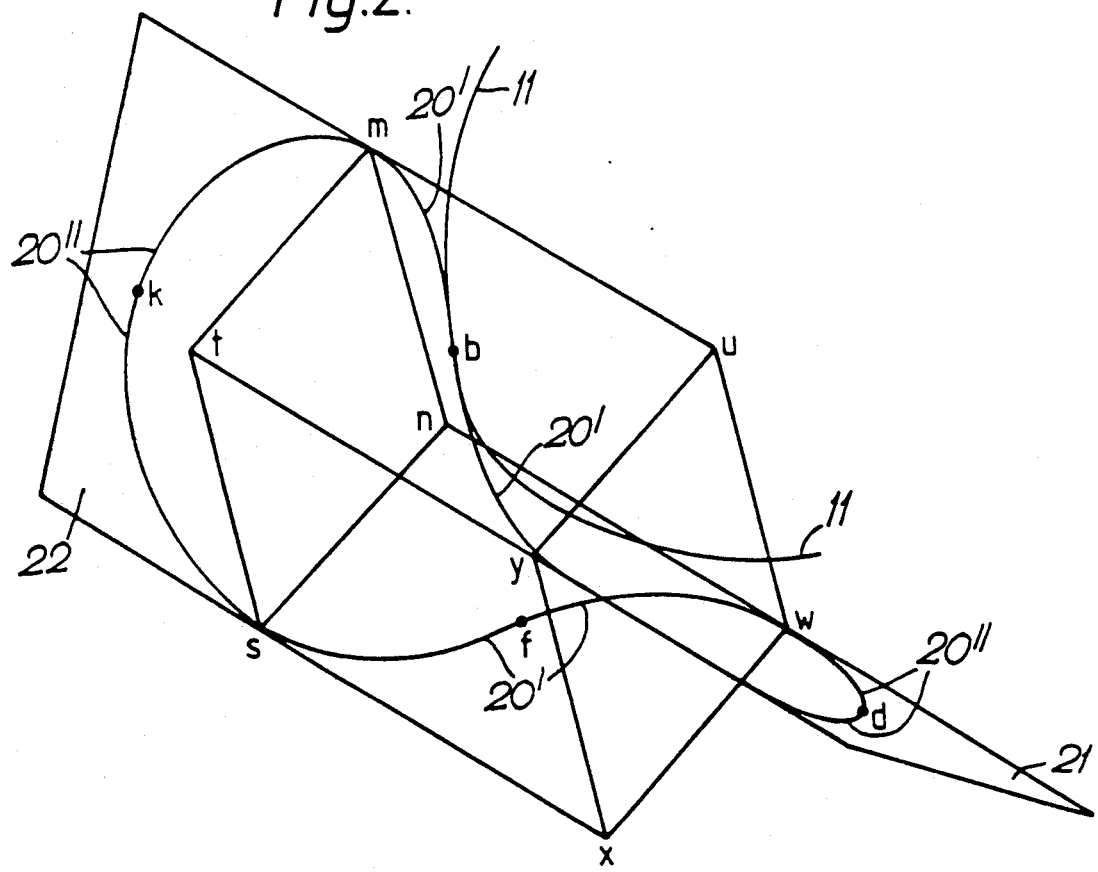
FIG. 2 depicts the coil of FIG. 1 after it has been twisted into a non-planar form.

The planar form of 10 in FIG. 1 is converted to a non-planar form depicted at 20 in FIG. 2 by twisting the two planar uniform radius of curvature portions 13 of FIG. 1 in opposite senses each through 45° to form the planar uniform radius of curvature portions 20" that lie in orthogonal planes 21 and 22 respectively containing n, w, y, t and m, u, x, s. The planar uniform radius of curvature portions now extend respectively from 'w' through 'd' to 'y', and from 's' through 'k' to 'm'. In consequence of this twisting, the straight portions 10' of FIG. 1 are converted into planar lazy-S portions 20' extending respectively from 'm' through 'b' to 'y', and from 'w' through 'f' to 's'. Over the length 'm' to 'b' the lazy-S has one curvature while over the region 'b' to 'y' it has the opposite curvature, and similarly the regions 'w' to 'f' and 'f' to 's' have oppositely directed curvatures. These oppositely directed curvatures of regions 20' are much less strongly curved than the regions 20".

The non-planar form of 20 of FIG. 2 is found to exhibit circular birefringence instead of linear birefringence, and modulation of the distance separating the two regions 20' by means of a loudspeaker coil and magnet assembly 34 (FIG. 3, but not shown in FIG. 2) is found, for a given displacement, to modulate that circular birefringence to a significantly greater extent than the corresponding modulation of linear birefringence produced by modulating the displacement of the planar coil of FIG. 1. Thus, for example, in the case of a coil 20 comprising 50 turns (for illustrative convenience only one turn represented in FIG. 5) of acrylate coated 125 μm diameter single mode fibre with a 9 μm diameter optical core connected at 35 and 36 respectively to the centres of the front and back faces of the loudspeaker coil and magnet assembly 34 to provide an approximately 20 mm radius of curvature for the portions 20" of the coil it was found that full-wave modulation (360° on the Poincaré sphere) of the circular birefringence was obtained by modulating the displacement between the front and back faces of the assembly by about 2 mm. The circular birefringence exhibited by this form of coil is believed to arise from the twists present in the fibre in the lazy-S portions 20', and the modulation of birefringence to result from the modulation of these twists brought about by the modulation of the distance separating these two portions of the coil.

Figure 3:
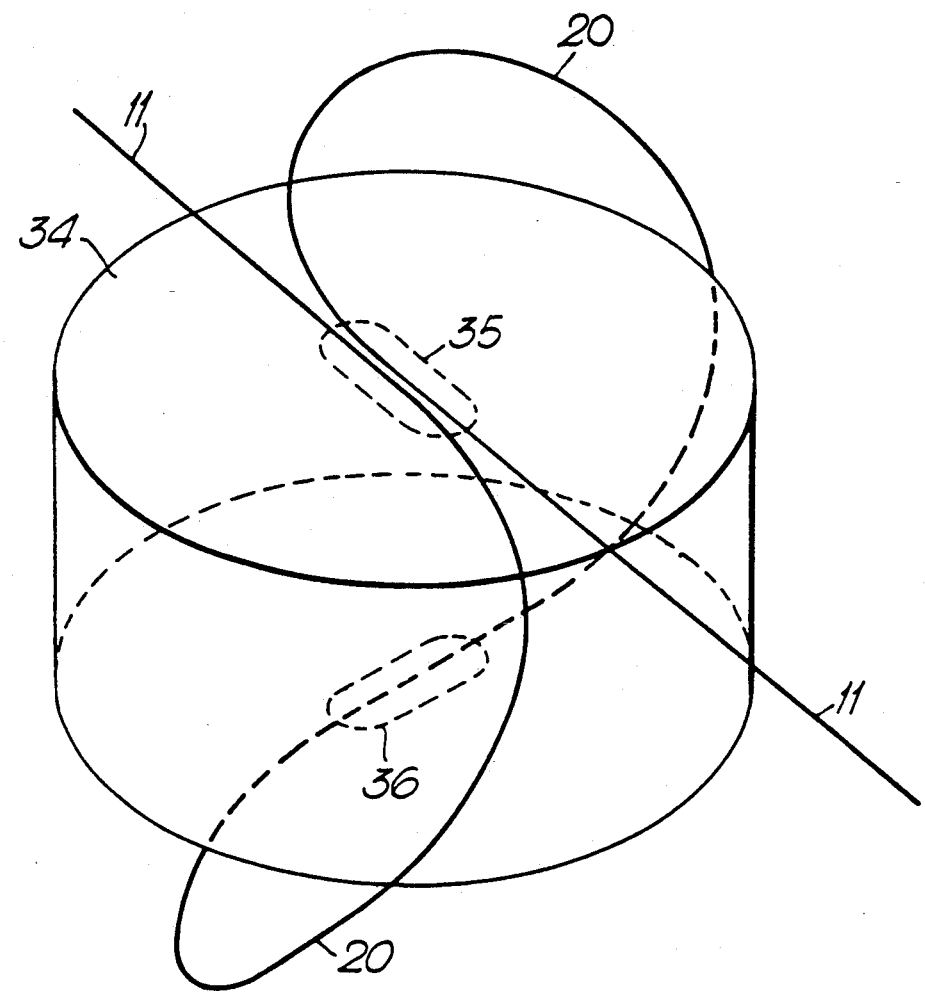
FIG. 3 depicts a polarisation state controller employing a coil of the form of FIG. 2.
Figure 4:
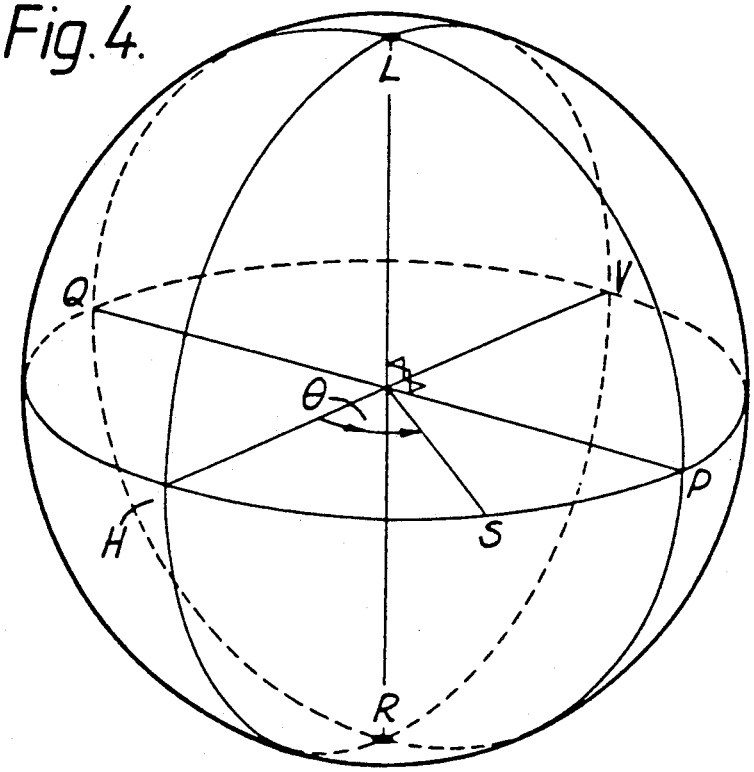
FIG. 4 is a Poincaré sphere diagram.

A single loudspeaker coil and magnet assembly 34 and non-planar optical fibre coil 20, as depicted in FIG. 3, is not able on its own to provide for a given input SOP every possible output SOP. All possible SOP's are represented in FIG. 4 as points on the surface of a Poincaré sphere in which the poles L and R represent circularly polarised states, and the equator through HQV and P represent all possible linearly polarised states. The coil 20 exhibits circular birefringence, and so the eigenaxis for this coil passes through the points L and R on the Poincaré sphere of FIG. 4. Passage of light through the coil causes a change in SOP represented by a rotation on the Poincaré sphere about the eigenaxis through an angle determined by the strength of the circular birefringence. If therefore light is launched into the coil 20 linearly polarised in a direction corresponding to the point H on the Poincaré sphere, the SOP will evolve, in its passage through the coil, through SOP's lying on the equator. Thus, by varying the strength of the birefringence presented by the coil, the output SOP can be set to any desired orientation of linearly polarised state but, for a linearly polarised input state, no elliptically polarised output state or circularly polarised output state is immediately accessible.

Figure 5:
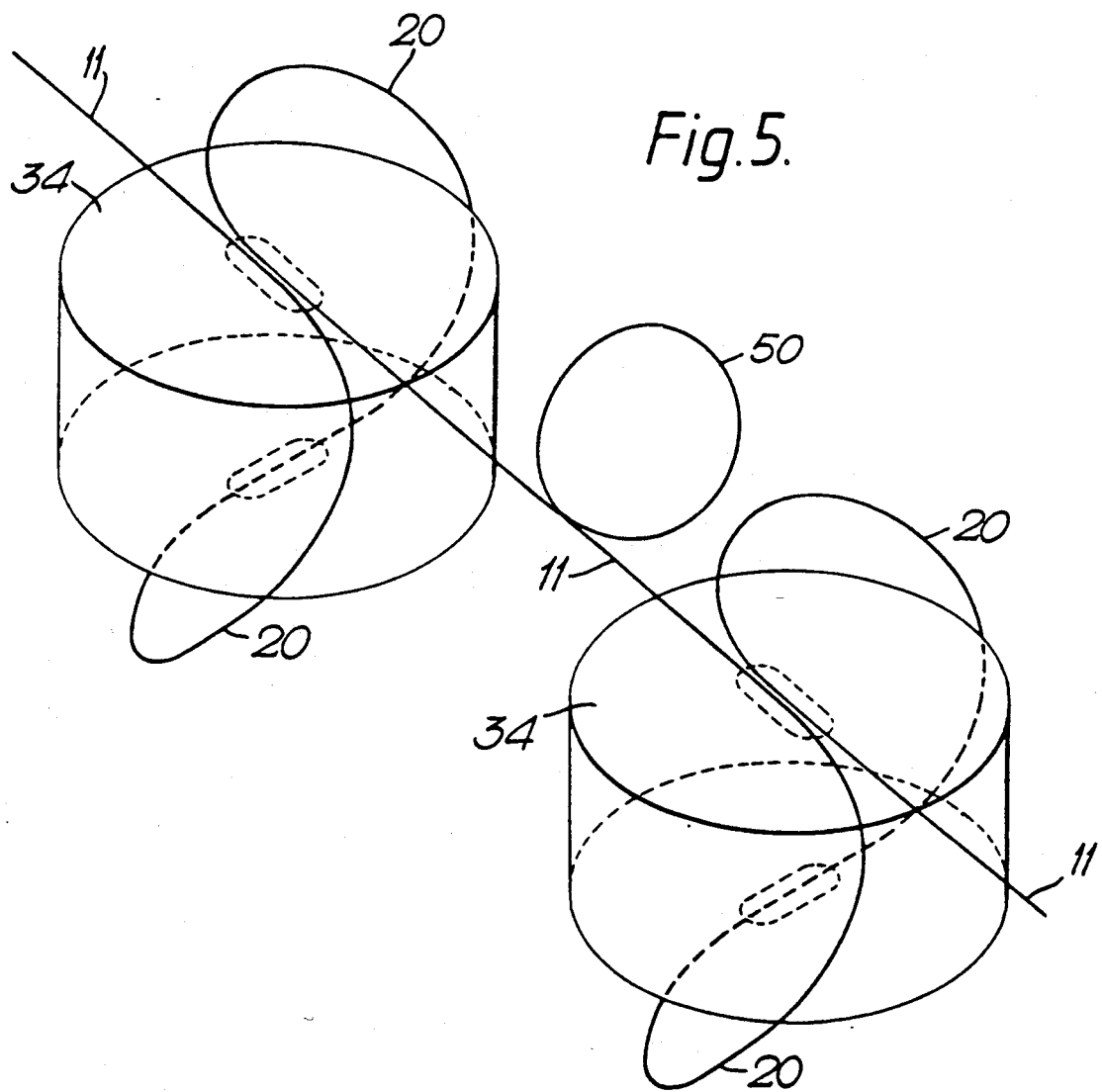
FIG. 5 depicts a polarisation state controller employing a tandem arrangement of two of the controllers of FIG. 3 and a quarter-wave linearly birefringent coil.

The arrangement of FIG. 5, comprising a tandem pair of coils 20, each with its own loudspeaker coil and magnet assembly 34, and an intervening coil 50 dimensioned and oriented to function as a quarter-wave ($\lambda/4$) linear birefringence retarder, provides the extra degree of freedom necessary to allow, for a given input SOP, the output of any chosen output SOP, linear or otherwise. This can be demonstrated with reference to the Poincaré spheres of FIGS. 4 and 6.

Referring first to FIG. 4, linearly polarised light polarised in the plane corresponding to the point H in FIG. 4 is launched into the first coil 20 of FIG. 5. The output SOP from this first coil is therefore given by some point on the equatorial line through HQV and P of FIG. 4. This light then passes through coil 50 which is a quarter-wave linear retarder. Since this retarder is a linear retarder, its eigenaxis lies in the equatorial plane, and since this retarder is a quarter-wave retarder, the rotation provided is through one right-angle. Choosing the eigenaxis for this linear retarder to extend through Q and P means that the plane of polarisation of the point H is at 45° to this eigenaxis. In other words, the light launched into the first coil 20 is plane polarised at 45° to the principal axes of the retarder formed by coil 50.

Figure 6:
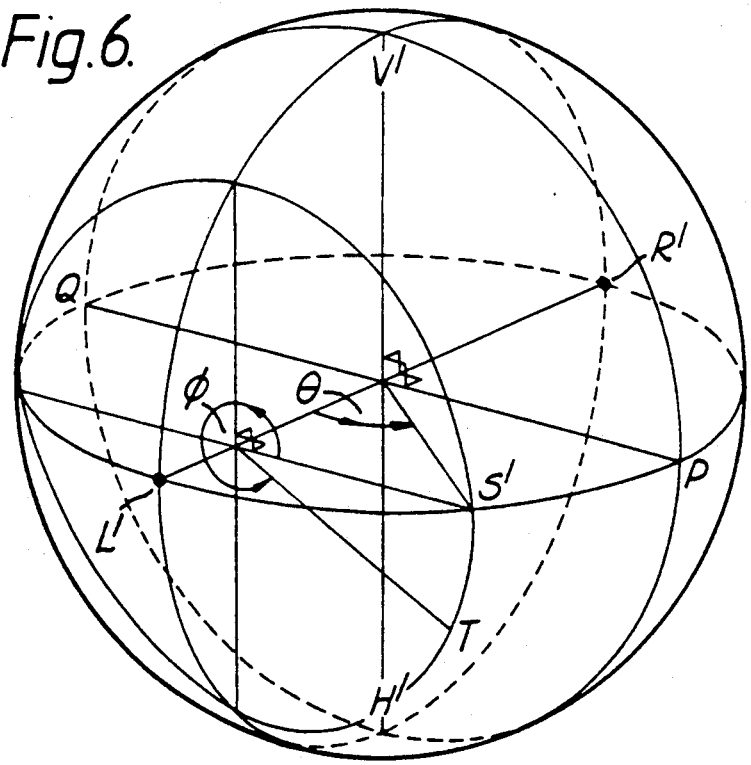
FIG. 6 is a further Poincaré sphere diagram.

In FIG. 6 the quarter-wave rotation about the axis through Q and P transforms the points HLV and R of FIG. 4 respectively into the points L'V'R' and H'. Thus for instance, light entering the coil 50 linearly polarised in the plane corresponding to the point H in FIG. 4 will emerge circularly polarised from that coil 50, and hence in FIG. 6 this SOP of the light emerging from the coil 50 is represented by the point L'. If however the light entering the coil 50 linearly polarised in the plane corresponding to the point P in FIG. 4, it would be entering the coil 50 plane polarised in one of the principal planes of its retardation, and hence the light will emerge still plane polarised in the same plane, which is the plane corresponding to the point P in both FIGS. 4 and 6. Thus it is seen that the rotation about the axis through L and R provided by the first coil 20, by which the output from the first coil 20 is evolved from the linearly polarised state corresponding to the point H through PV and Q in FIG. 4, is transformed by the retardation of coil 50 into a rotation about an axis through V' and H' from L' through P' R' and Q' in FIG. 6.

The second coil 20 of FIG. 5, like the first, exhibits circular birefringence, and so its eigenaxis passes through the points L' and R'. If therefore the first coil 20 is capable of being modulated through a half-wave so as to be able to set the output SOP from the first coil 20 to any point on the arc from H through P to V, and if the second coil 20 is capable of being modulated through a full wave, then it is seen that any point on the Poincaré sphere can be reached. For instance a rotation through $\theta$ given by the first coil 20 from the point H in FIG. 4 to the point S is represented in FIG. 6 as a rotation from L' to the point S'. Then the full-wave modulation of the second coil 20 takes the output SOP to any point on the small circle that passes through S' and whose normal coincides with the axis through L' and R'. Thus a rotation of $\phi$ provided by the second coil takes the output SOP to the point T in FIG. 6.

The tandem arrangement of FIG. 5 involving the use of two coils 20 can be used to provide, for a given input SOP, any desired output SOP, and in this context it may be noted that this is achievable in a single length of single mode fibre without intermediate splices or couplers of any sort. However for a number of applications a facility is required for it to be possible to arrange the output SOP to track the SOP of some other device whose SOP can vary in an arbitrary manner. Using the tandem arrangement of FIG. 5, a difficulty can be encountered.

Suppose for instance the output SOP is required to track cyclically around the great circle through L' P R' and Q of FIG. 6 in the direction L'PR'Q. Starting at L', the energisation of the loudspeaker assembly 34 of the first coil 20 of FIG. 5 is progressively changed to increase the birefringence angle $\theta$ from 0° to 180° while the energisation of the loudspeaker assembly 34 of the second coil 20 is maintained at a constant value keeping the birefringence angle $\phi$ at 0°. By this means the output SOP tracks from L' through P to R'. At this stage the energisation of the loudspeaker assembly 34 of the second coil 20 is changed to a new value, one that changes the birefringence angle $\phi$ from 0° to 180°. This change produces no change in the output SOP because the input SOP to the second coil 20 is currently at the point R', which is on the eigenaxis of this second coil 20. Once $\phi$ has been changed to 180°, 0 can be progressively reduced from 180° to 0° to take the output SOP round the second half of the great circle, that is from R' back to L' by way of Q. When L' is reached, $\phi$ can be reduced from 180° back to 0° without changing the output SOP, and the cycle can be repeated.

Suppose however now, that the output SOP is required to track cyclically around the great circle through PV'Q and H' in the direction PV'QH'. Starting at P, the energisation of the loudspeaker assembly 34 of the first coil 20 of FIG. 5 is set to a value to maintain the birefringence angle 0 at 90°. This is maintained while the energisation of the loudspeaker assembly 34 of the second coil 20 is progressively changed to increase its birefringence angle $\phi$ from 0° progressively up to 360° thereby taking the output SOP from P through V'Q and H' and back to P again. If the cycle is to be repeated, the progressive change in energisation of the loudspeaker assembly 34 of the second coil 20 needs to be continued. Clearly there is a physical limit to the displacement change that can be provided by this loudspeaker assembly, and hence there is a finite range over which the birefringence angle $\phi$ can be tracked. Accordingly, with the arrangement of FIG. 5, it is not possible to track all possible changes of SOP.

Figure 7:
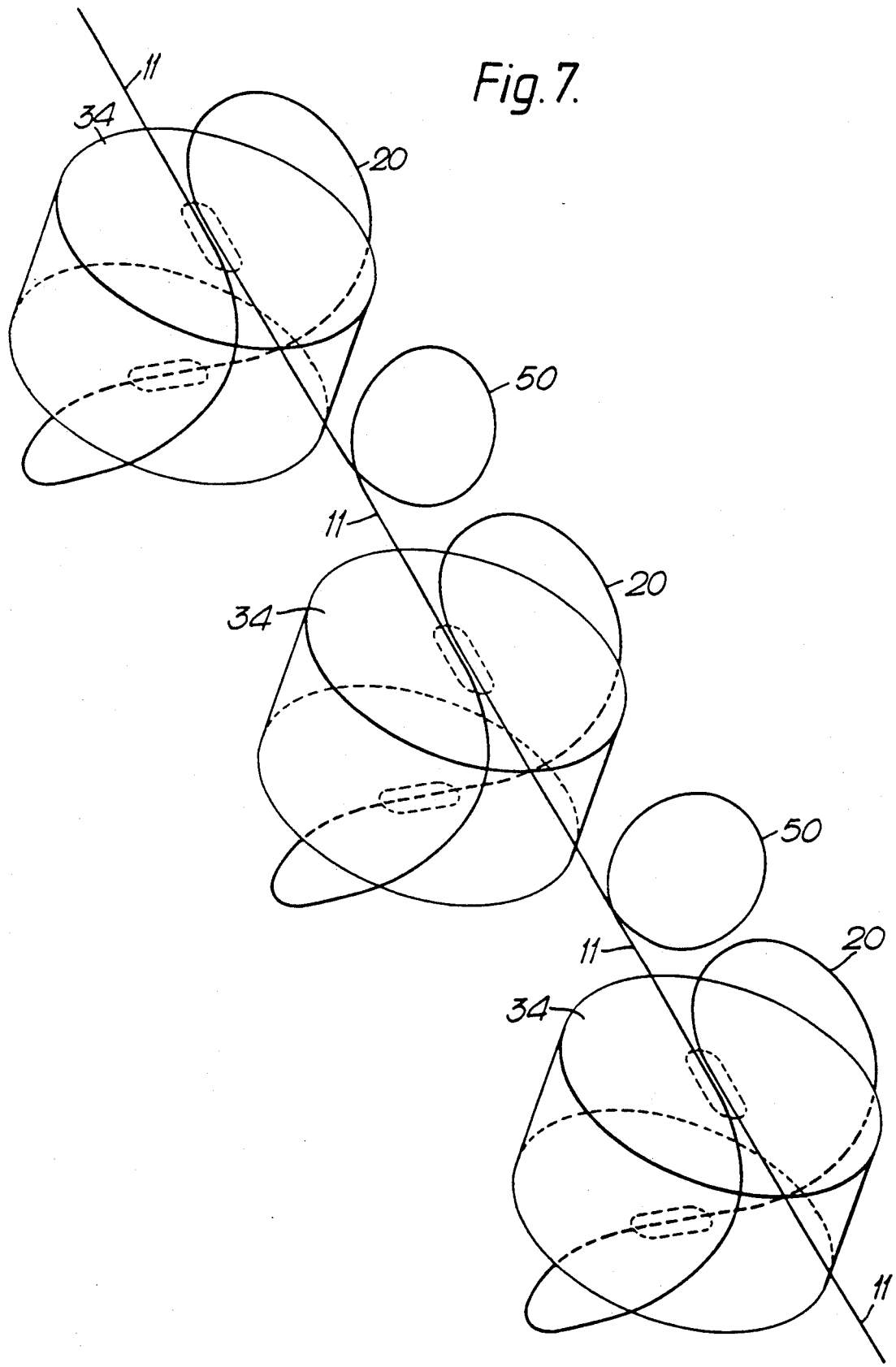
FIG. 7 depicts a polarisation state controller employing a tandem arrangement of three of the controllers of FIG. 3 with an intervening pair of quarter-wave linearly birefringent coils.

This problem is resolved with the tandem arrangement of FIG. 7 comprising three coils 20, each with its own loudspeaker coil and magnet assembly 34, and an intervening pair of coils 50, each dimensioned and oriented to function as a quarter-wave ($\lambda/4$) linear birefringence retarder. The presence of the third coil 20 and second coil 50 allows any change in output SOP to be tracked without ever calling for the birefringence angle $\phi$ provided by the middle coil 20 to range over more than 360° while the birefringence angles 0 and 0', provided respectively by the first and third coils 20 are each called to range over not more than 180°.

It has already been explained how a cyclic change of SOP repeatedly around the great circle L'PR' and Q can be accommodated without difficulty. It is also evident that this is also true in respect of the more general case of any excursion repeatedly around the V'H' axis of FIG. 6. It is also evident that the same situation applies in respect of excursions repeatedly around the PQ axis. The difficulty arises with repeated excursions around the L'R' axis, and in particular it appears that any change in SOP that involves a crossing of the half great circle L'PR' from the V' hemisphere to the H' hemisphere requires $\phi$ to range below 0°, while any crossing in the opposite direction (from the H' hemisphere to the V' hemisphere) requires $\phi$ to range above 360°. With the three coil 20 arrangement of FIG. 7, this problem is avoided by arranging the energisation of the loudspeaker assembly of the third coil to provide a birefringence angle $\theta'$ of 0° at all times except when the output of the middle coil 20 is required to cross the half great circle L'PR'. Whenever this line is to be crossed, for instance at the point S', the energisation of the loudspeaker assembly of the first coil 20 is changed to reduce the birefringence angle $\theta$ from $\theta°$ to 0° while the energisation of the loudspeaker assembly of the third coil 20 is changed to increase its birefringence angle $\theta'$ in synchronisation from 0° to $\theta°$. At this stage the energisation of the loudspeaker assembly of the middle coil 20 is altered to change the birefringence angle $\phi$ from 0° to 360°, or from 360° to 0°, according to whether the transition across the half great circle L'PR' is from the H' hemisphere to the V' hemisphere or from the V' hemisphere to the H, hemisphere. This change of birefringence angle $\phi$ produces no effect upon the output SOP because the input SOP to the middle coil is currently at the point L', which is the eigenaxis of this middle coil 20. Once this change of birefringence angle $\phi$ has been effected, the birefringence angles 0 and $\theta'$ are restored to their original values of 0° and 0° respectively.

I claim:

1. An optical fibre polarisation state controller including a coil of single mode optical fibre, means mechanically coupling said coil to a transducer, said coil being a coil twisted out of planar form so as to make it circularly birefringent, and means associated with the transducer for adjusting the amount of the twist of the coil out of planar form.

2. An optical fibre polarisation state controller as claimed in claim 1, wherein the transducer is an electromechanical transducer.

3. A tandem arrangement of two optical fibre polarisation state controllers as claimed in claim 2, and an intervening coiled length of the single mode fibre providing quarter-wave linear birefringence.

4. A tandem arrangement of three optical fibre polarisation state controllers as claimed in claim 2, and between each pair of said three controllers an intervening coiled length of the single mode fibre providing quarter-wave linear birefringence.

5. A tandem arrangement of two optical fibre polarisation state controllers as claimed in claim 1, and an intervening coiled length of the single mode fibre providing quarter-wave linear birefringence.

6. A tandem arrangement of three optical fibre polarisation state controllers as claimed in claim 1, and between each pair of said three controllers an intervening coiled length of the single mode fibre providing quarter-wave linear birefringence.

7. An optical fibre polarisation state controller including a coil of single mode optical fibre, means mechanically coupling said coil to a transducer, the coil having two substantially diametrically opposed regions of relatively larger radius of curvature linked by two substantially diametrically opposed substantially planar regions of relatively smaller radius of curvature, the coil being configured such that the planes of the two planar regions of relatively smaller radius of curvature lie in substantially orthogonal planes, and including means associated with the transducer for adjusting the spacing of the relatively larger radius of curvature regions.

8. An optical fibre polarisation state controller as claimed in claim 7, wherein the transducer is an electromechanical transducer.

9. A tandem arrangement of two optical fibre polarisation state controllers as claimed in claim 8, and an intervening coiled length of the single mode fibre providing quarter-wave linear birefringence.

10. A tandem arrangement of three optical fibre polarisation state controllers as claimed in claim 8, and between each pair of said three controllers an intervening coiled length of the single mode fibre providing quarter-wave linear birefringence.

11. A tandem arrangement of two optical fibre polarisation state controllers as claimed in claim 7, and an intervening coiled length of the single mode fibre providing quarter-wave linear birefringence.

12. A tandem arrangement of three optical fibre polarisation state controllers as claimed in claim 7, and between each pair of said three controllers an intervening coiled length of the single mode fibre providing quarter-wave linear birefringence.

* * * * *